United States Patent
Kim (10) Patent No.: US 8,694,064 B2
(45) Date of Patent: Apr. 8, 2014

(54) CASE FOR MOBILE ELECTRONIC DEVICE WITH TOUCH SCREEN

(75) Inventor: Dae-Young Kim, Seoul (KR)

(73) Assignee: SGP Korea, Seoul (KR)

( * ) Notice: Subject to any disclaimer, the term of this patent is extended or adjusted under 35 U.S.C. 154(b) by 0 days.

(21) Appl. No.: 13/188,909

(22) Filed: Jul. 22, 2011

(65) Prior Publication Data

US 2013/0023313 A1    Jan. 24, 2013

(51) Int. Cl.
*H04M 1/00*    (2006.01)

(52) U.S. Cl.
USPC ............... 455/575.8; 455/575.1; 455/575.4; 455/575.5

(58) Field of Classification Search
CPC ... H04M 1/00; H04M 1/0202; H04M 1/0206; H04M 1/0249
USPC ............ 455/575.1, 575.4, 575.5, 575.8
See application file for complete search history.

(56) References Cited

U.S. PATENT DOCUMENTS

| | | | |
|---|---|---|---|
| 7,072,699 B2* | 7/2006 | Eiden .................... | 455/575.8 |
| 7,686,629 B1* | 3/2010 | Yu et al. ................ | 439/136 |
| 2011/0228458 A1* | 9/2011 | Richardson et al. ..... | 361/679.01 |
| 2011/0319147 A1* | 12/2011 | Tages et al. ........... | 455/575.8 |

* cited by examiner

*Primary Examiner* — Patrick Edouard
*Assistant Examiner* — Shantell L Heiber
(74) *Attorney, Agent, or Firm* — Jefferson IP Law LLP (57) ABSTRACT

A case for a mobile electronic device with a touch screen is provided. The case comprises a base frame and first and second frames. The base frame contacts the back of the mobile electronic device and includes coupling parts at the periphery thereof. The first frame wraps one widthwise side and both lengthwise sides, over a certain distance, of the mobile electronic device. The second frame wraps the other widthwise side and both lengthwise sides, over the remaining distance except the distance of lengthwise sides wrapped by the first frame. The first and second frames comprise guard parts for wrapping part of the periphery of the front of the mobile electronic device. The base frame is coupled to the first and second frames by the coupling parts, thereby wrapping the back, widthwise and lengthwise sides, of the mobile electronic device.

7 Claims, 5 Drawing Sheets

CASE FOR MOBILE ELECTRONIC DEVICE WITH TOUCH SCREEN

BACKGROUND OF THE INVENTION

1. Field of the Invention

This invention relates to case structures. More particularly, the present invention relates to a case for a mobile electronic device with a touch screen that includes a base frame and first and second frames, which are separate and configured in such a manner that the base frame has a rail and the first and second frames have rail connectors to be firmly connected with the rail. Therefore, the case can reduce frictional contact areas that may damage a mobile electronic device when the mobile electronic device is coupled/separated thereto/therefrom. The case can also distribute the impact of the mobile electronic device when the case coupled with the mobile electronic device is dropped on the floor.

2. Description of the Related Art

Mobile electronic devices, such as mobile phones, PDAs, DMBs, etc. are widely used by people. For example, mobiles phones have been developed to provide a variety of additional functions, such as a video playback, an audio playback, a digital camera function, a DMB function, a navigation function, an Internet function, etc., as well as a call function. In addition, mobile phones are designed to be attractive in appearance and shape. Mobile phones have also been developed with a touch screen on their front side, which increases their cost.

Users handle their expensive mobile phones carefully so as not to scratch, damages, or break them. Moreover, they also decorate their mobile phones to enhance their appearance.

In order to comply with user's requests, i.e., to prevent the mobile electronic devices from being damaged and decorating the mobile electronic device to be attractive, various types of cases and cases made of various materials for mobile electronic devices have been developed and sold in the market. Conventional cases for mobile electronic devices with a touch screen can be divided into two types as follows.

One is a soft case made of synthetic leather. This conventional soft case is configured to wrap the front and back of a mobile electronic device with a touch screen, so that it can protect the mobile electronic device against scratches. However, the soft case is disadvantageous in that it may change color over time and it may not protect a mobile electronic device from a strong external impact. In addition, when the soft case wraps the front and back of a mobile electronic device with a touch screen, it must be removed by the user so that he/she can operate the touch screen. That is, the conventional soft case requires additional operation from the user in order to use the mobile electronic device and thus causes him/her to be inconvenienced.

The other type is a hard case made of metal or synthetic resin. The conventional hard case is shaped as a container type with panel members to wrap the sides and back of a mobile electronic device, where the panel members are integrally formed. That is, the mobile electronic device is fitted into the hard case. To this end, the conventional hard case must form additional protrusions, etc., therein to tightly fix a mobile electronic device therein. In that case, when a mobile electronic device is fitted into the hard case, the additional protrusions, etc., formed in the hard case, however, may cause damage such as scratches on the external surface of the mobile electronic device. In addition, while the mobile electronic device installed to the hard case is being used, a space may be created therebetween so their coupling is loosened. In that case, the hard case can scratch the sides and back of the mobile electronic device.

Therefore, a new case is required with a structure that can safely protect a mobile electronic device with a touch screen against damage and can provide high endurance performance.

SUMMARY OF THE INVENTION

Aspects of the present invention are to address at least the above-mentioned problems and/or disadvantages and to provide at least the advantages described below. Accordingly, an aspect of the present invention is to provide a case for a mobile electronic device with a touch screen that includes a base frame, and first and second frames, which are separate, thereby reducing friction applied to the mobile electronic device and thus preventing the mobile electronic device from being damaged.

In accordance with an aspect of the present invention, a case for a mobile electronic device with a touch screen is provided. The case includes a base frame forming rails, and first and second frames with rail coupling parts, where the rails and the rail coupling parts are coupled so that they can be slid vertically, so that the base frame and the first and second frames can be tightly coupled and thus their endurance can be increased.

In accordance with an aspect of the present invention, a case for a mobile electronic device with a touch screen is provided. The case includes a base frame forming rails, and first and second frames with rail coupling parts, where a guide protrusion includes a receiving portion that is tapered at the end and receives the rail coupling part, so that it can be smoothly coupled with the base frame and first and second panels at the beginning.

In accordance with an aspect of the present invention, a case for a mobile electronic device with a touch screen is provided. The case includes a base frame, and first and second frames, where a first bent portion additionally includes a first curved part that is curved and protruded in the periphery portion where both ends of first and second frames contact each other, so that the first and second frames can be tightly coupled to the base frame.

In accordance with an aspect of the present invention, a case for a mobile electronic device with a touch screen is provided. The case includes a base frame, and first and second frames, where: both ends of a first frame includes coupling members protruded in the outer direction; and both ends of a second frame includes coupling member receiving parts that are formed at positions corresponding to the coupling members, and are reduced in depth as they go farther from the end to the inner direction of the second rag plate, so that the coupling member is fitted to the coupling member receiving part.

In accordance with an aspect of the present invention, a case for a mobile electronic device with a touch screen is provided. The case includes a base frame and first and second frames, and enhances appearance and improves the grip by rounding the bent parts included in the case.

In accordance with an exemplary embodiment of the invention, a case for a mobile electronic device with a touch screen is provided. The case includes a base frame and first and second frames. The base frame contacts the back of the mobile electronic device. The base frame includes coupling parts at the periphery thereof. The first frame wraps one widthwise side and both lengthwise sides, over a certain distance, of the mobile electronic device. The second frame wraps the other widthwise side and both lengthwise sides, over the remaining distance except the distance of lengthwise sides wrapped by the first frame. The first and second frames comprise guard parts for wrapping part of the periphery of the front of the mobile electronic device. The base frame is coupled to the first and second frames by the coupling parts, thereby wrapping the back, widthwise and lengthwise sides, of the mobile electronic device.

Preferably, the coupling parts comprise: the first and second bent parts. The first bent part is bent and extended vertically in the bottom, at a certain position spaced apart from the edge of the base frame toward the inner direction. The second bent part is bent at the end of the first bent part, in the outer direction, in a direction perpendicular to the first bent part, and extends.

Preferably, the lengthwise side comprises: a guide protrusion and a rail. The guide protrusion is protruded on the second bent part, spaced apart from the first bent apart at a certain distance, along the lengthwise direction. The rail, formed as a guide groove on the second bent part, is depressed and extended between the guide protrusion and the first bent part. The first and second frames comprises a rail coupling part that wraps part of the periphery of the back of the base frame and is shaped as steps that correspond to the guide groove and the guide groove. The rail is slidably coupled to the rail coupling part.

Preferably, the guide protrusion comprises a receiving portion that is tapered at the end that couples to the rail coupling part.

Preferably, the periphery portion where the ends of the first and second frames contact each other on the first bent part further comprises: a first curved part that is protrudently curved.

Preferably, the guide protrusion further comprises: a second curved part that is protrudently curved at a position corresponding to that of the first curved part.

Preferably, the first frame comprises a coupling member that is protrudently formed at the end in the direction of the end of the second frame. The second frame comprises a coupling member receiving part that is formed at a position corresponding to the coupling member and reduces it depressed depth as it extends from the end to the inner direction of the second frame. The coupling member is fitted into the coupling member receiving part.

Preferably, base frame and the first and second frames are formed in such a manner to round at least one edge of the first and second bent parts and the coupling part, the guard part, and the connector, the rails and the rail coupling parts.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

BRIEF DESCRIPTION OF SYMBOLS IN THE DRAWINGS

10: through-hole
100: base frame
101: 1st bent part
102: 2nd bent part
110: guide groove
120: guide protrusion
121: receiving portion
130: 1st curved part
200: 1st frame
201: protrusion part
210: top plate
220: 1st rag plate
221: coupling member
230: guard part
231: curve part
240: connector
241: guide groove coupling part
242: guide protrusion coupling part
300: 2nd frame
310: bottom plate
320: 2nd rag plate
321: coupling member receiving part
500: mobile electronic device

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
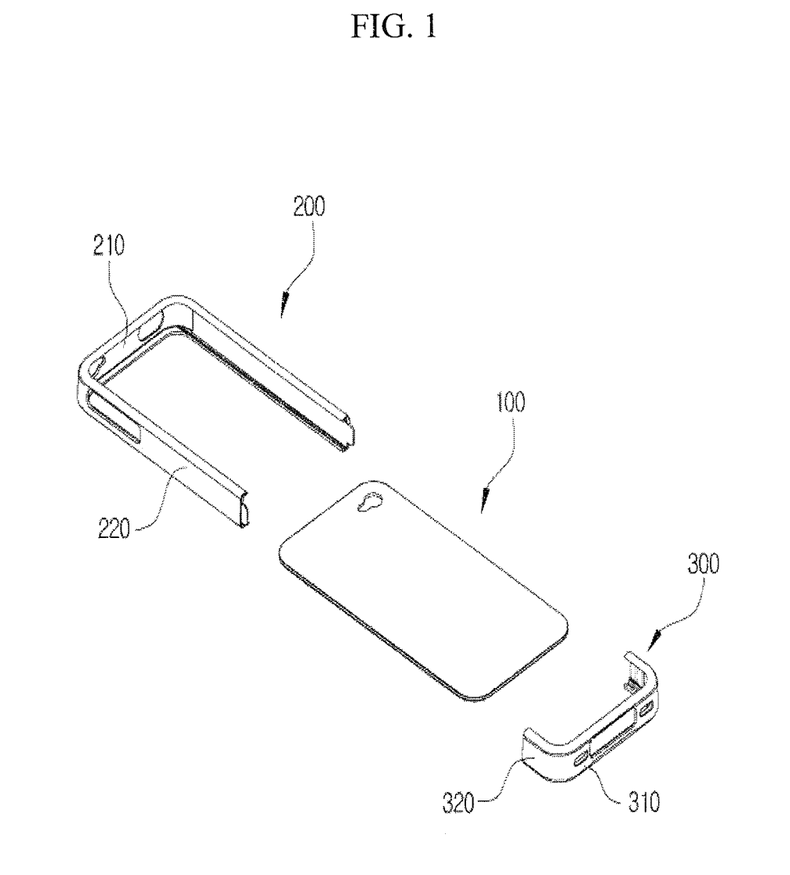
FIG. 1 illustrates a perspective view of a case for a mobile electronic device with a touch screen, according to an exemplary embodiment of the present invention.

FIG. 1 illustrates a perspective view of a case for a mobile electronic device with a touch screen, according to an exemplary embodiment of the present invention.

Although the embodiment of the invention is described based on a mobile electronic device, it should be understood that the invention is not limited to the embodiment. It will be noted that the invention can also applied to a variety of electronic devices with a touch screen, for example, PDAs, UMPCs, PMPs, MP3 players, electronic-book readers, etc.

In the following description, the respective portions of the mobile electronic device will be described so that: two parallel lengthwise lateral sides are called, for short, two lengthwise sides; two parallel widthwise lateral sides are called, for short, two widthwise sides; the front refers to the side on which the touch screen is installed; and the back is opposite to the front.

As shown in FIG. 1, the case for a mobile electronic device with a touch screen includes a base frame 100 that the back of the mobile electronic device contacts, and first and second frames 200 and 300, connected to the periphery of the base frame 100, for wrapping the sides of the mobile electronic device.

The base frame 100 is shaped as a flat rectangular plate with an area similar to the area of the back of the mobile electronic device and covers the back of the mobile electronic device. The base frame 100 also forms a coupling part along the periphery, which is connected to the first and second frames 200 and 300. The coupling part may be implemented with a fitting type, a slide type, an adhesive type, etc. In order to connect the base frame 100 to the first and second frames 200 and 300, it will be noted that they have corresponding coupling parts.

The first frame 200 is shaped in such a manner that: the top plate 210 is formed to have a length and a width and wraps the top widthwise side of the mobile electronic device; and a pair of first rag plates 220 are extended from both ends of the top plate 210 toward the lengthwise sides of the mobile electronic device, respectively, and wraps top parts of the lengthwise sides of the mobile electronic device, respectively. The first frame 200 with the top plate 210 and a pair of first rag plates 220 is shaped as the Korean letter ' ' pronounced "Digeuk," when viewed from above.

Figure 3:
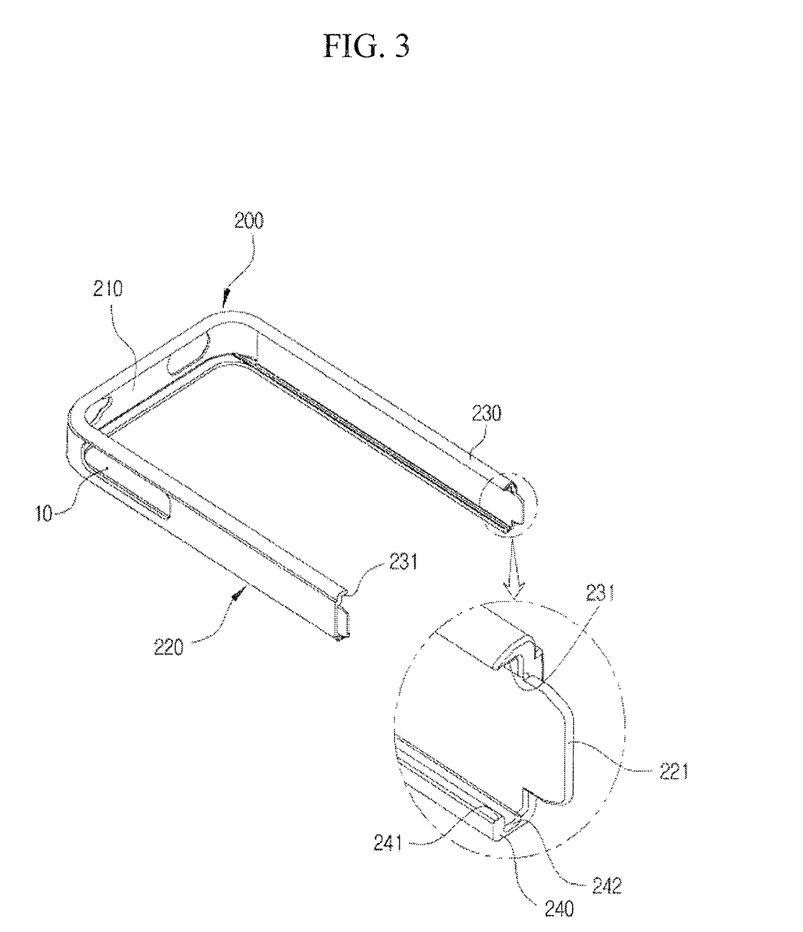
FIG. 3 illustrates a perspective view of a first frame of the case shown in FIG. 1 according to an exemplary embodiment of the present invention.

The top plate 210 and the first rag plates 220, as shown in FIG. 3, form a guard part 230 and a connector 240 which are formed along at their both lengthwise ends, respectively, in such a manner that the guard part 230 and connector 240 are curved toward the inner direction, i.e., the direction of wrapping the top widthwise side and part of the lengthwise sides of the mobile electronic device. That is, the guard part 230 wraps the periphery of the front of the mobile electronic device, a certain length, and the connector 240 also wraps the periphery of the back of the base frame 100, a certain length. That is, as shown in FIG. 3, the cross-sectional view or side view of the first rag plate 220 is also shaped as the Korean letter ' ' pronounced "Digeuk." The guard part 230 is shaped as a picture frame, without covering the touch panel of the touch screen of the mobile electronic device, but instead wrapping the periphery of the front of the touch panel, a certain length. This makes it easy for the user to operate the touch panel. Likewise, the connector 240 wraps the periphery of the back of the base frame 100 covering the back of the mobile electronic device and also is connected to the coupling part of the base frame 100. Therefore, the connector 240 can more stably couple the case to the mobile electronic device with a touch screen.

The second frame 300 is a similar shape to the first frame 200 and thus serves to perform the same function as first frame 200. The second frame 300 includes a bottom plate 310 for protecting the bottom widthwise side of the mobile electronic device and a pair of second rag plates 320 extended from both ends of the bottom plate 310.

The summation of the lengths of the first and second rag plates 220 and 320 is similar to that of both lengthwise sides of the mobile electronic device. The first and second rag plates 220 and 320 may be implemented in such a manner that the length of each first rag plate 220 is that of each second rag plate 320 (i.e., the length of each first 220 or second 320 rag plate is half the length of each lengthwise side of the mobile electronic device). It is however preferable that the length of each first rag plate 220 is 60~80% of the length of each lengthwise side of the mobile electronic device in order to increase the endurance and to more tightly couple the case and the mobile electronic device. That is, when the first and second rag plates 220 and 230 are coupled to each other at a lower position toward the bottom than at the position of half the length of each lengthwise side of the mobile electronic device, the user can easily couple/separate the case to/from the mobile electronic device.

The base frame 100 and the first and second frames 200 and 300 form through-holes 10 on their bodies to expose function control elements of the mobile electronic device that are to be interfaced with the outside, for example, a camera button, interface terminals, etc. The through-holes 10 may vary in position and shape according to the type of mobile electronic device. Since the through-holes 10 are well known to the skilled persons in the art, a detailed description of these will be omitted in the application.

The case according to the invention has a feature whereby the base frame 100 and the first and second frames 200 and 300 are assembled via coupling parts to form a container-like frame (that wraps the back and the lengthwise and widthwise sides of the mobile electronic device) and then the base frame 100 is removed from the container-like frame.

As described above, as the case is configured with first and second frames 200 and 300, and the base frame 100 serving as a separate component, it can be tightly coupled to the mobile electronic device and can also increase endurance. Therefore, compared with a container-like case, the case according to the invention can reduce the friction that may be applied to the mobile electronic device when it is installed/separated to/from the mobile electronic device. Therefore, the case according to the invention can reduce damage to the mobile electronic device, such as scratches, etc. The case can also minimize the inner space where the mobile electronic device may be moved, thereby preventing the back of the mobile electronic device from being scratched while the mobile electronic device is being used. In addition, when the mobile electronic device installed to the case is dropped, the case according to the invention can more effectively distribute the impact, compared with conventional container-like case or conventional cover-type case (that is made of leather and covers the front and back of the mobile electronic device), thereby minimizing physical damage to the mobile electronic device. Additionally, since the frames are included separately in the case, when one frame is broken down or damaged, instead of replacing all the frames, only the corresponding frame needs to be replaced with a new one, which provides a practical advantage to the user. Since the case can allow a particular image, picture or photograph to be inserted onto the outer surface of the base frame 100, i.e., opposite to the inner surface contacting the back of the mobile electronic device, it can enhance the appearance of the mobile electronic device. In particular, the user can select from a number of base frames that have a variety of images, pictures or photographs, and install one of the base frames to the back of the mobile electronic device, thereby decorating the mobile electronic device as he/she desires.

In addition, the case according to the invention is formed in such a manner that the base frame 100 and the first and second frames 200 and 300 have mostly rounded edges (bent portions), to provide a smooth feeling and improved grip to users and to also effectively distribute any external impact.

Figure 5:
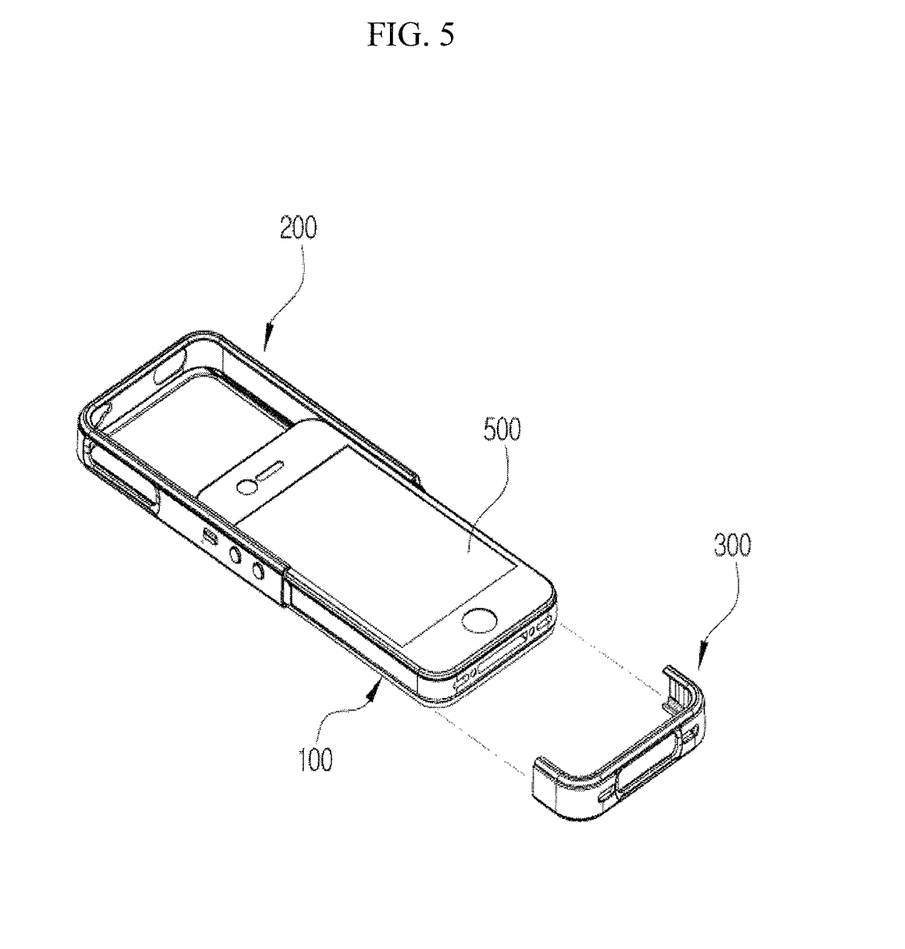
FIG. 5 illustrates a perspective view when a mobile electronic device is coupled to the case according to an exemplary embodiment of the present invention.

FIG. 5 illustrates a perspective view when a mobile electronic device is coupled to the case according to an exemplary embodiment of the present invention.

As shown in FIG. 5, the base frame 100 is located on the back of the mobile electronic device 500. After that, via the coupling parts, the first frame 200 is coupled to the mobile electronic device 500 in a top to bottom direction, and, likewise, the second frame 300 is also coupled to the mobile electronic device 500 in a bottom to top direction. Therefore, the first and second frames 200 and 300 can wrap the periphery of the back of the base frame 100 and the lengthwise and widthwise sides of the mobile electronic device 500.

The coupling parts may be implemented with various types of connection mechanisms that are well known to persons skilled in the art. In addition, the first and second frames 200 and 300 may be coupled to each other, at their ends (i.e., the ends of the first and second rag plates 220 and 320), via various types of connection methods that are well known to persons skilled in the art.

The coupling parts may be implemented with a fitting type, a slide type, an adhesive type, etc. In an embodiment of the invention, it is preferable that the coupling parts are implemented with a slide type, so that the first and second frames 200 and 300 are slidably coupled with the rails formed in the base frame 100.

Figure 2:
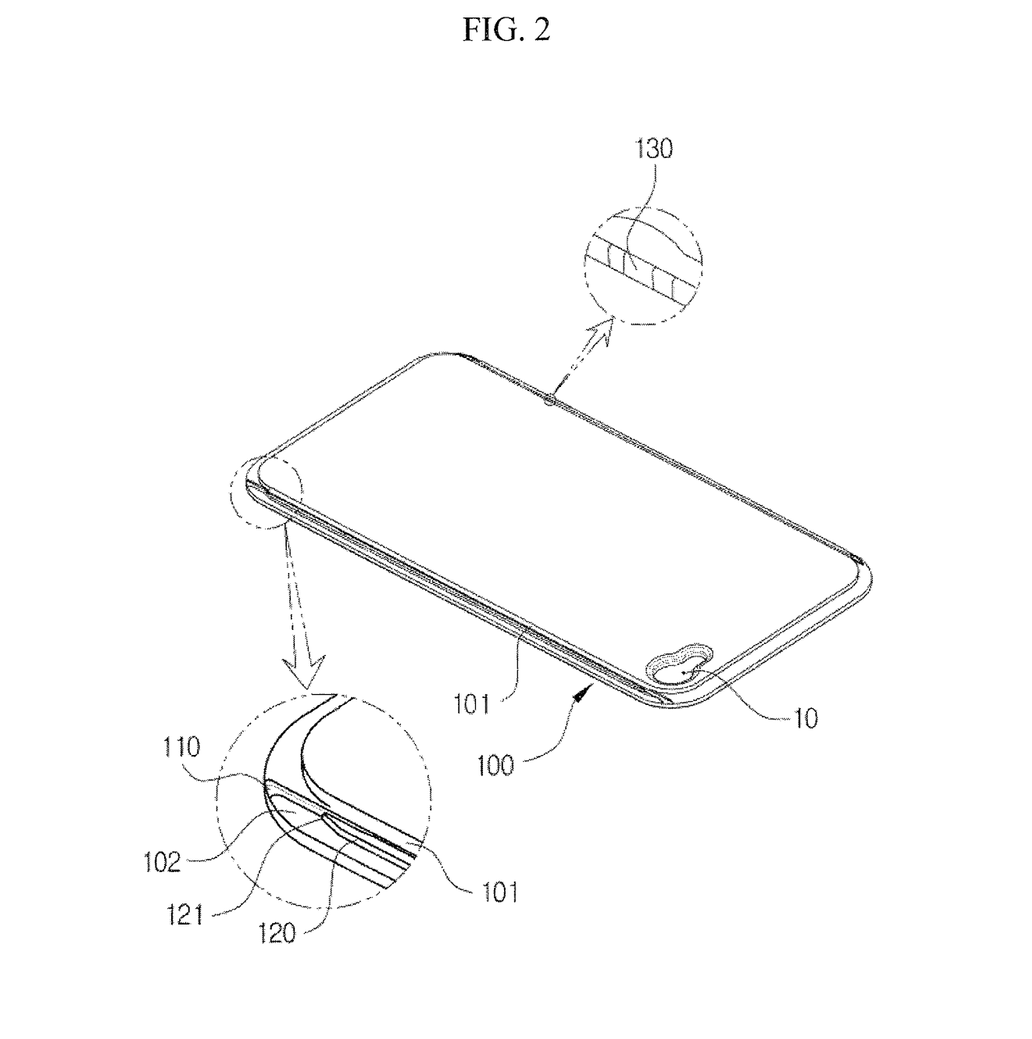
FIG. 2 illustrates a perspective view of a base frame of the case shown in FIG. 1 according to an exemplary embodiment of the present invention.

FIG. 2 illustrates a perspective view of a base frame of the case shown in FIG. 1 according to an exemplary embodiment of the present invention.

In the following description, it is assumed that the surface of the base frame 100 contacting the back of the mobile electronic device 500 is called an inner surface and the opposite surface not contacting the back of the mobile electronic device 500 is called an outer surface.

As shown in FIG. 2, the coupling parts of the base frame 100 are configured in such a manner that rails are formed along both lengthwise edges on the outer surface of the base frame 100.

The base frame 100 forms steps on the outer surface along the periphery, i.e., a first bent part 101 and a second bent part 102. The first bent part 101 is perpendicularly formed on the outer surface, with a certain height, in the thickness direction, at a certain distance spaced apart from the edge of the base frame 100, along the periphery of the edge. The second bent part 102 is extended from the end of the first bent part 101 toward the periphery edge of the base frame 100, in a perpendicular direction towards the first bent part 101. Therefore, as shown in FIG. 2, the outer surface of the base frame 100 is formed in such a manner that its original area is reduced and the reduced outer surface is relatively protruded in the outer direction from the first bent part 101. The first bent part 101 refers to a lengthwise surface corresponding to height difference between the steps. The height of the first bent part 101 is the height difference between two steps. Likewise, the second bent part 102 refers to a widthwise surface corresponding to the width difference between two steps. The second bent part 102 extends from the bottom end of the first bent part 101 to the outside of edge, perpendicular to the first bent part 101.

The coupling part of the base frame 100 is formed in such a manner that a rail is formed on the second bent part 102. The rail includes a guide groove 110 and a guide protrusion 120.

The guide protrusion 120 is shaped as a long bar. The guide protrusion 120 is formed in the second bent part 102, spaced apart at a certain distance from the first bent part 101, in the lengthwise direction of the first bent part 101. That is, as shown in FIG. 2, the guide protrusion 120 is attached at a position where the edge of the base frame 100 starts to straighten from the rounded position, i.e., at a position spaced from the edge of the base frame 100, along the lengthwise direction of the base frame 100. This makes the guide protrusion 120 easier to attach to a flat surface than a rounded and curved surface. In addition, attaching the guide protrusion 120 to a position located at an inner direction increases the endurance of the case.

In particular, the guide protrusion 120 includes a receiving portion 121. The receiving portion 121 is shaped in such a manner that its end is taped to couple with the rail coupling part. The receiving portion 121 forms a tip (i.e., the most pointed portion) that faces the inside (i.e., to the guide groove 110) of the base frame 100. The receiving point 121 serves to smoothly receive and couple with the base frame 100 and the first and second frames 200 and 300. It should be understood that the shape of the base frame 100 may be altered to achieve the objective described above.

The first and second curved parts 130 (not shown) may be formed, at a position around a portion where both ends of the first and second rag plates 220 and 230 contact each other, on the lengthwise surface at the inner location (i.e., to the mobile electronic device 500) of the guide protrusion 120. The first curved part 130 is slightly protruded on the outer side (i.e., to the side of the guide protrusion 120) of the first bent part 101. The second curved part (not shown) is protruded to the inner direction (i.e., the side of the first bent part 101) at a portion corresponding to the first curved part 130, in the inner lengthwise side of the guide protrusion 120.

The first and second curved parts 130 (not shown) are formed in such a manner as to reduce the space of the guide groove 110 at the portions where the first and second rag plates 220 and 230 contact each other, thereby providing proper friction and fixation when a guide groove coupling part 241, which will be described later, is slidably moved. Therefore, the rails are tightly coupled to the rail coupling parts, so that the mobile electronic device 500 can be more stably installed to the case.

The guide groove 110 is a groove extended along the lengthwise direction of the base frame 100, which is depressed toward the lower side at one end side in both sides of the base frame 100. The guide groove 110 runs from the top to the bottom of the base frame 100, along the space between the guide protrusion 120 and the first bent part 101. Both ends of the guide groove 110 are curved, so that they can be smoothly coupled with the guide groove coupling parts 241.

As described above, the rails are slidably coupled with the rail coupling parts of the first and second frames 200 and 300. Since they are coupled to each other in the lengthwise direction, they can help the case to more stably couple to the mobile electronic device 500.

Figure 4:
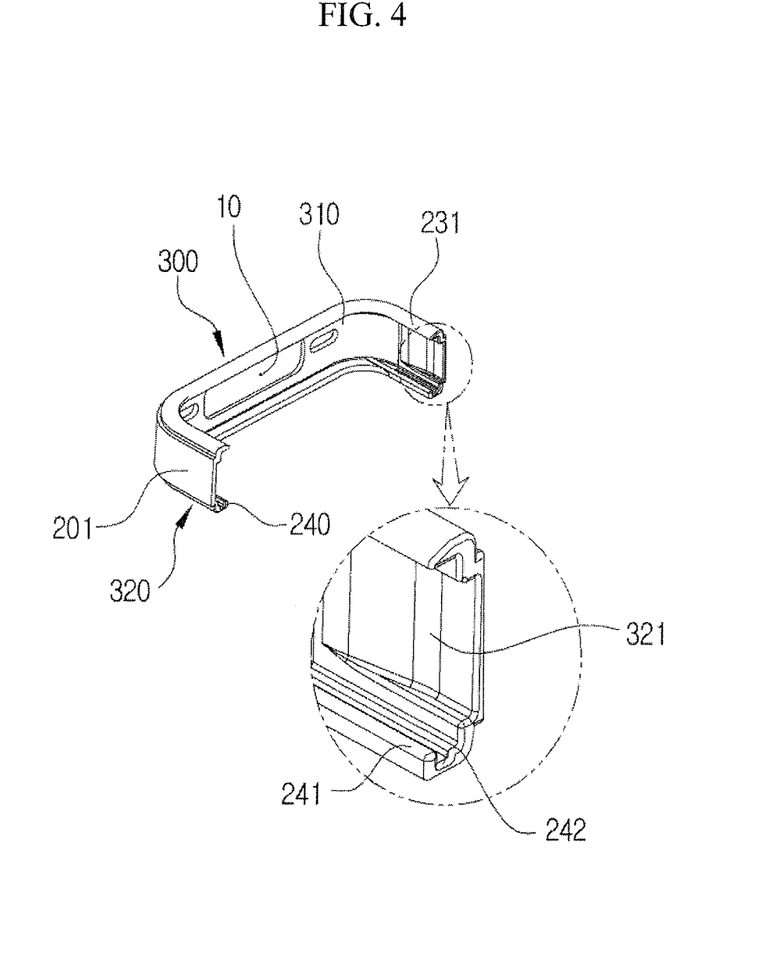
FIG. 4 illustrates a perspective view of a second frame of the case shown in FIG. 1 according to an exemplary embodiment of the present invention.

FIG. 3 illustrates a perspective view of a first frame of the case shown in FIG. 1 and FIG. 4 illustrates a perspective view of a second frame of the case shown in FIG. 1 according to an exemplary embodiment of the present invention.

As shown in FIGS. 3 and 4, the first and second frames 200 and 300 form the rail coupling parts that are coupled to the rails of the base frame 100. The rail coupling part includes a guide groove coupling part 241 and a guide protrusion coupling part 242 which correspond to the guide groove and the guide protrusion 120 respectively.

The guide groove coupling part 241 and the guide protrusion coupling part 242 form on the inner surfaces (the upper surface) of the connectors 240 of the first and second frames 200 and 300. The guide groove coupling part 241 and the guide protrusion coupling part 242 are shaped, corresponding to the guide groove 110 and the guide protrusion 120, so that they can be tightly coupled to each other.

In addition, the first and second frames 200 and 300 each form a protrusion part 201 that is protruded, at a certain height, with a certain width less than the width of each frame, in the outer direction, perpendicular to the surfaces of the first and second frames 200 and 300, along the length of the first and second frames 200 and 300. Forming the protrusion part 201 is achieved by depressing the inner side of each of the first and second frames 200 and 300. This depressed portion receives the lengthwise and widthwise sides of the mobile electronic device 500, so that the guard part 230 does not directly contact the touch screen of the mobile electronic device 500. Therefore, when the mobile electronic device 500 is coupled/separated to/from the case, its front cannot be damaged, or scratched.

The guard part 230 of the first and second rag plates 230 forms a curve part 231. The curve part 231 is located along one lengthwise edge of the guard part 230, corresponding to the position where the front of the mobile electronic device 500 is located, and is curved in an inner direction, i.e., the direction of wrapping the periphery of the front of the touch screen. In that case, when the curve part 231 is close to a mobile electronic device, the thickness of the guard part 230 is thin as shown in FIGS. 3 and 4.

That is, when the first and second rag plates 220 and 320 extend their one edge to the guard part 230, their inner sides are perpendicularly bent, and the outer sides are reduced in the thickness toward the end of the guard part 230. This gives the guard part 230 a smoother appearance, and also reduces pressure that can be applied, by the guard part 230, to the periphery of the front of the mobile electronic device 500, which can prevent the front from being damaged. Therefore, the curve part 231 can minimize damage to the touch screen, such as scratches, when the mobile electronic device 500 is coupled/separated to/from the case. In addition, when the mobile electronic device 500 is coupled to the case, the curve part 231 can be fitted closer to the periphery of the front of the mobile electronic device 500, thereby increasing the stability of coupling the mobile electronic device 500 to the case.

As described above, the first and second rag plates 220 and 320 are coupled to the base frame 100 to wrap the lengthwise and widthwise sides of the mobile electronic device 500. To this end, the first rag plate 220 forms a coupling member 221, and the second rag plate 320 forms a coupling member receiving part 321.

The coupling member 221 is shaped as a plate that has a length less than the width of the first rag plate 220, and formed at the end of the first rag plate 220. That is, as shown in FIG. 3, the coupling member 221 is formed at a certain portion between the connector 240 and the guard part 230 at the end of the first rag plate 220. The coupling member 221 is fitted into the coupling member receiving part 321.

The coupling member receiving part 321 is shaped as a groove that is formed at the end of the second rag plate 320, and receives the coupling member 221 when the first and second rag plates 220 and 320 are coupled to each other. In particular, the coupling member receiving part 321 is reduced in depth as it goes farther from the end to the inner direction of the second rag plate 320.

Therefore, the coupling member 221 can be more easily inserted to the coupling member receiving part 321 at the begging, and then more tightly fitted thereinto as it proceeds in the direction of the coupling member receiving part 321. Accordingly, the case can be more stably connected to the mobile electronic device. In addition, the case does not scratch to the mobile electronic device while the coupling member 221 is being coupled to the coupling member receiving part 321.

The components, included in the case for a mobile electronic device with a touch screen according to the invention, can be made of the same material. However, in order to efficiently distribute or absorb the impact, the base frame 100 and the first and second frames 200 and 300 should be made of different materials. In addition, regarding one component, it can be made of different materials with respect to a particular position. In an embodiment of the invention, it is preferable that the case for a mobile electronic device with a touch screen is made of metal or synthetic resin.

As described above, the case for a mobile electronic device with a touch screen, according to the invention, has the following advantages:

1) Since the case includes a base frame and first and second frames that wrap the back and the sides of a mobile electronic device, it can prevent the mobile electronic device from being damaged, such as scratched, when it is coupled/separated to/from the mobile electronic device.

2) When the mobile electronic device with the case is dropped, the case can efficiently distribute the impact applied to the mobile electronic device.

3) Since the rails and the rail coupling parts are coupled in the lengthwise direction of the case, they are more durable and can be tightly coupled to each other.

4) First and second curve parts are formed on a particular portion of the rail, and thus allow the rail to more tightly couple to the rail coupling part.

5) The case can provide a smoother appearance and grip, by rounding all bent portions in the case.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A case for a mobile electronic device with a touch screen, the case comprising:
  a base frame that contacts the back of the mobile electronic device, the base frame including coupling parts at a periphery thereof;
  a first frame for wrapping one widthwise side and both lengthwise sides, over a certain distance, of the mobile electronic device; and
  a second frame for wrapping the other widthwise side and both lengthwise sides, over the remaining distance except the distance of lengthwise sides wrapped by the first frame,
  wherein:
  the first and second frames comprise guard parts for wrapping part of the periphery of the front of the mobile electronic device; and the base frame is coupled to the first and second frames by the coupling parts, thereby wrapping the back, widthwise and lengthwise sides, of the mobile electronic device; and the coupling parts comprise:

a first bent part that is bent and extended vertically in a bottom, at a certain position spaced apart from the edge of the base frame toward an inner direction; and a second bent part that is bent at an end of the first bent part, in an outer direction, in a direction perpendicular to the first bent part, and extends; and the lengthwise side comprises:

a guide protrusion that is protruded on the second bent part, spaced apart from the first bent apart at a certain distance, along the lengthwise direction;

a rail formed as a guide groove on the second bent part, which is depressed and extended between the guide protrusion and the first bent part;

the first and second frames comprises a rail coupling part that wraps part of the periphery of the back of the base frame and is shaped as steps that correspond to the guide groove; and the rail is slidably coupled to the rail coupling part.

2. The case of claim 1, wherein the guide protrusion comprises:

a receiving portion that is tapered at the end that couples to the rail coupling part.

3. The case of claim 1, wherein the periphery portion where the ends of the first and second frames contact each other on the first bent part further comprises:

a first curved part that is protrudently curved.

4. The case of claim 3, wherein the guide protrusion further comprises:

a second curved part that is protrudently curved at a position corresponding to that of the first curved part.

5. The case of claim 1, wherein:

the first frame comprises a coupling member that is protrudently formed at the end in the direction of the end of the second frame;

the second frame comprises a coupling member receiving part that is formed at a position corresponding to the coupling member and reduces it depressed depth as it extends from the end to the inner direction of the second frame; and the coupling member is fitted into the coupling member receiving part.

6. The case of claim 1, wherein the base frame and the first and second frames are formed in such a manner to round at least one edge of the first and second bent parts and the coupling part, the guard part, and a connector, the rails and the rail coupling parts.

7. A case for a mobile electronic device with a touch screen, the case comprising:

a base frame that contacts the back of the mobile electronic device, the base frame including coupling parts at a periphery thereof;

a first frame for wrapping one widthwise side and both lengthwise sides, over a certain distance, of the mobile electronic device; and a second frame for wrapping the other widthwise side and both lengthwise sides, over the remaining distance except the distance of lengthwise sides wrapped by the first frame, wherein:

the first and second frames comprise guard parts for wrapping part of the periphery of the front of the mobile electronic device; and the base frame is coupled to the first and second frames by the coupling parts, thereby wrapping the back, widthwise and lengthwise sides, of the mobile electronic device; and the coupling parts comprise:

a first bent part that is bent and extended vertically in a bottom, at a certain position spaced apart from the edge of the base frame toward an inner direction; and a second bent part that is bent at an end of the first bent part, in an outer direction, in a direction perpendicular to the first bent part, and extends; and the lengthwise side comprises:

a guide protrusion that is protruded on the second bent part, spaced apart from the first bent apart at a certain distance, along the lengthwise direction; and a rail formed as a guide groove on the second bent part, which is depressed and extended between the guide protrusion and the first bent part, wherein the first and second frames comprises a rail coupling part that wraps part of the periphery of the back of the base frame and is shaped as steps that correspond to the guide groove.

* * * * *